(12) United States Patent
Ballnik et al.

(10) Patent No.: US 9,171,536 B2
(45) Date of Patent: Oct. 27, 2015

(54) NOISE CONTROL OF THERMAL COMPONENTS IN A HYBRID ELECTRIC VEHICLE

(71) Applicant: GM Global Technology Operations LLC, Detroit, MI (US)

(72) Inventors: Christopher D.S. Ballnik, Milford, MI (US); Keith D. Buford, Southfield, MI (US); Stephen L. Shen, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 13/742,412

(22) Filed: Jan. 16, 2013

(65) Prior Publication Data

US 2014/0198919 A1    Jul. 17, 2014

(51) Int. Cl.
  *H04R 29/00*   (2006.01)
  *G10K 11/175*  (2006.01)
  *F02M 35/12*   (2006.01)
  *H04B 1/00*    (2006.01)

(52) U.S. Cl.
  CPC ......... *G10K 11/175* (2013.01); *F02M 35/1244* (2013.01)

(58) Field of Classification Search
  CPC .................................................. H04R 2499/13
  USPC .................................... 381/302, 86, 389, 365
  See application file for complete search history.

(56) References Cited

U.S. PATENT DOCUMENTS

| | | | |
|---|---|---|---|
| 2006/0106524 A1* | 5/2006 | Schmitz et al. | 701/112 |
| 2008/0066476 A1* | 3/2008 | Zhu et al. | 62/133 |
| 2012/0152186 A1* | 6/2012 | Sujan et al. | 123/41.09 |

\* cited by examiner

*Primary Examiner* — Paul S Kim
*Assistant Examiner* — Norman Yu
(74) *Attorney, Agent, or Firm* — Cantor Colburn LLP

(57) ABSTRACT

Noise control for a vehicle is implemented by identifying sources of noise that are indicative of vehicle noise producing components. The sources of noise include a thermal management device of a hybrid-electric component of the vehicle and non-hybrid-electric components of the vehicle. The noise control is further implemented by determining a decibel value of the noise produced by each of the vehicle noise producing components, selecting the decibel value of one of the vehicle noise producing components having a highest decibel value as a mask limit, and determining an operational limit for the thermal management device. The operational limit includes a lowest threshold operating value which, when implemented, maintains a threshold level operating efficiency of the hybrid-electric component. If a decibel value of the noise produced by the thermal management device exceeds the mask limit, the noise control includes reducing a level of operation of the thermal management device to coincide with the decibel value of the operational limit.

20 Claims, 2 Drawing Sheets

NOISE CONTROL OF THERMAL COMPONENTS IN A HYBRID ELECTRIC VEHICLE

FIELD OF THE INVENTION

The subject invention relates to hybrid electric vehicles and, more particularly, to noise control of thermal components for hybrid electric vehicles.

BACKGROUND

Technology improvements in the automotive field have yielded quieter engines and exhaust features on all types of vehicles, particularly electric and hybrid electric vehicles. Most vehicle operators are familiar with (and even anticipate) the types of sounds produced by conventional gasoline-powered vehicles, such as noises associated with engine speed (e.g., via acceleration) and vehicle speed (e.g., noise produced from wind resistance). However, as electric- and hybrid-powered vehicles are relatively new, many operators are less familiar with the sounds emitted (e.g., from thermal management components) from such vehicles. Moreover, as electric and hybrid vehicles tend to be quieter than conventional vehicles, any noise produced by these vehicles tends to be more noticeable.

Accordingly, it is desirable to provide a way to control the noise produced by hybrid electric vehicles in order to provide a more pleasing experience for operators thereof.

SUMMARY OF THE INVENTION

In one exemplary embodiment of the invention, a method for implementing noise control for a vehicle is provided. The method includes identifying sources of noise in the vehicle via a computer processor. The sources of noise are indicative of vehicle noise producing components and include a thermal management device of a hybrid-electric component of the vehicle and non-hybrid-electric components of the vehicle. The method also include determining a decibel value of the noise produced by each of the vehicle noise producing components, selecting, via the computer processor, the decibel value of one of the vehicle noise producing components having a highest decibel value as a mask limit, and determining an operational limit for the thermal management device. The operational limit includes a lowest threshold operating value which, when implemented, maintains a threshold level operating efficiency of the hybrid-electric component. The method further includes determining a decibel value associated with the operational limit. If a decibel value of the noise produced by the thermal management device exceeds the mask limit, the method includes reducing a level of operation of the thermal management device to coincide with the decibel value of the operational limit. If the decibel value of the noise produced by the thermal management device is lower than or meets the mask limit, the method includes maintaining a current level of operation of the thermal management device.

In another exemplary embodiment of the invention, a system for implementing noise control for a vehicle is provided. The system includes a computer processor and logic executable by the computer processor. The logic is configured to implement a method. The method includes identifying sources of noise in the vehicle via a computer processor. The sources of noise are indicative of vehicle noise producing components and include a thermal management device of a hybrid-electric component of the vehicle and non-hybrid-electric components of the vehicle. The method also include determining a decibel value of the noise produced by each of the vehicle noise producing component and, selecting, via the computer processor, the decibel value of one of the vehicle noise producing components having a highest decibel value as a mask limit, and determining an operational limit for the thermal management device. The operational limit includes a lowest threshold operating value which, when implemented, maintains a threshold level operating efficiency of the hybrid-electric component. The method further includes determining a decibel value associated with the operational limit. If a decibel value of the noise produced by the thermal management device exceeds the mask limit, the method includes reducing a level of operation of the thermal management device to coincide with the decibel value of the operational limit. If the decibel value of the noise produced by the thermal management device is lower than or meets the mask limit, the method includes maintaining a current level of operation of the thermal management device.

In yet another exemplary embodiment of the invention a computer program product for implementing noise control for a vehicle is provided. The computer program product includes a computer-readable storage medium having instructions embodied thereon, which when executed by a computer, cause the computer to implement a method. The method includes identifying sources of noise in the vehicle via a computer processor. The sources of noise are indicative of vehicle noise producing components and include a thermal management device of a hybrid-electric component of the vehicle and non-hybrid-electric components of the vehicle. The method also include determining a decibel value of the noise produced by each of the vehicle noise producing components, selecting, via the computer processor, the decibel value of one of the vehicle noise producing components having a highest decibel value as a mask limit, and determining an operational limit for the thermal management device. The operational limit includes a lowest threshold operating value which, when implemented, maintains a threshold level operating efficiency of the hybrid-electric component. The method further includes determining a decibel value associated with the operational limit. If a decibel value of the noise produced by the thermal management device exceeds the mask limit, the method includes reducing a level of operation of the thermal management device to coincide with the decibel value of the operational limit. If the decibel value of the noise produced by the thermal management device is lower than or meets the mask limit, the method includes maintaining a current level of operation of the thermal management device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
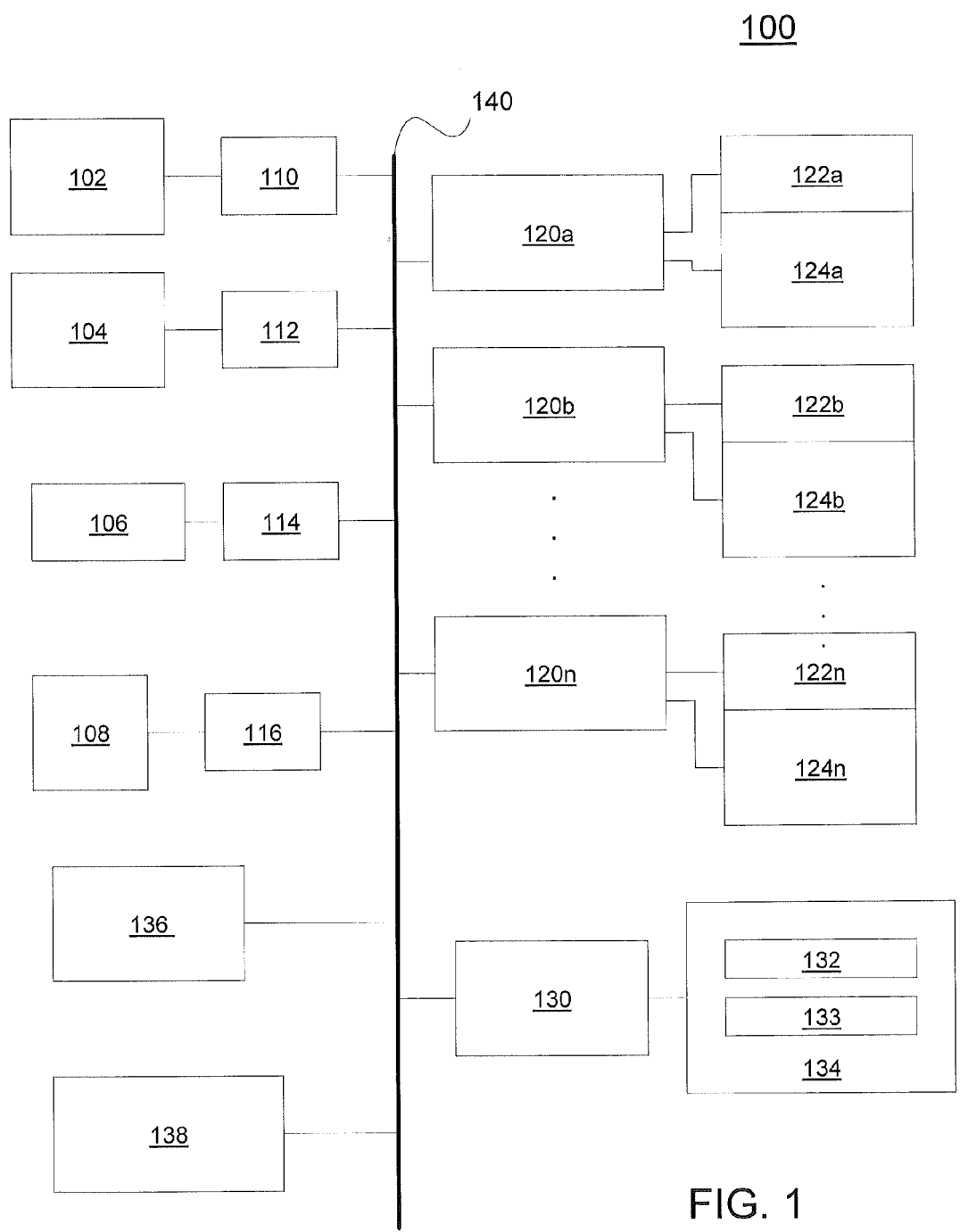
FIG. 1 is a system upon which noise control for a vehicle may be implemented in accordance with an exemplary embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment, noise control for an electric or hybrid electric vehicle is provided. The noise control includes a process in which existing sources of noise that produce identifiable and recognizable sounds in the vehicle are used to mask other sounds, which may not be readily identifiable by a vehicle operator. In one exemplary embodiment, the identifiable noises refer to those produced by components associated with the vehicle's internal combustion engine. Such noises include, e.g., those resulting from vehicle speed and engine speed. Other identifiable noises include those produced by a cooling fan and a heating, ventilation, and air conditioning (HVAC) system. The above-referenced identifiable noises and components producing these noises are just a few examples of identifiable noises and components that may be used to mask noises produced by other vehicle components. It will be understood by those skilled in the art, however, that other identifiable noises and related components may also be used in implementing the noise control processes described herein. For example, ambient noise produced by vehicle occupants, an infotainment system (e.g., music player), and wind noise in the vehicle cabin, e.g., when a window is open, may be used. These identifiable noises are produced by components referred to herein as non-hybrid-electric components.

In an embodiment, unidentifiable noises include those produced by thermal management devices of components of the vehicle that are associated with the electric power elements of the vehicle. These noises are referred to as 'unidentifiable' because they may not be readily recognizable, and thus not anticipated, by the vehicle operator. These types of noises may be disconcerting for the operator in that unanticipated noises are oftentimes attributed to component defects or malfunctions. Examples of such thermal management devices include fans, pumps, blowers, etc., that are responsible for controlling the temperature of the vehicle's electric powertrain components. These sources of noise are also referred to herein as vehicle noise producing components.

The exemplary noise control processes include evaluating the noise level for each of the sources of noise in the vehicle and using an arbitration mechanism to determine when and how to operate thermal management devices associated with hybrid components of the vehicle, such that the noises produced by the thermal management devices can be masked. In an embodiment, the noise control processes may be configured to be de-activated if desired, and may also be configured to conduct remedial arbitration when data from one or more noise sources in the vehicle cannot be acquired. In a further embodiment, the noise control processes may be configured to enable a user or operator of the vehicle to tune the parameters used by the noise control processes based on operator sensitivities to noise. These and other features of the noise control processes will now be described.

Turning now to FIG. 1, a system 100 upon which noise control may be implemented will now be described in an exemplary embodiment. The system 100 forms part of a hybrid electric vehicle, which may be an automobile, van, truck, or the like. While the noise control processes are described herein with respect to a hybrid vehicle, it will be understood that the processes are equally suited to electric-powered vehicles with minor variations in the sources of noise used in rendering corresponding calculations.

The system 100 of FIG. 1 includes an engine speed sensor 102, a vehicle speed sensor 104, a cooling fan sensor 106, and a heating, ventilation, and air conditioning (HVAC) system 108. The engine speed sensor 102, vehicle speed sensor 104, cooling fan sensor 106, and HVAC system 108 are communicatively coupled to a communication bus 140 of the vehicle via corresponding electronic control units (ECUs) 110, 112, 114, and 116, respectively.

The engine speed sensor 102 monitors the engine speed of the vehicle. For example, the engine speed sensor 102 may be attached to a crankshaft of the vehicle engine and assesses the speed at which the crankshaft spins, e.g., as measured in revolutions per minute (RPMs). The ECU 110 receives engine speed data from the engine speed sensor 102 and distributes the engine speed data over the communication bus 140 to one or more vehicle components, e.g., to the computer processor 130.

The vehicle speed sensor 104 monitors the vehicle speed of the vehicle. For example, the vehicle speed sensor 104 may be attached to wheel components to measure speed values and acceleration/deceleration, e.g., as measured in miles per hour or feet per second squared. The ECU 112 receives the vehicle speed data from the vehicle speed sensor 104 and distributes the speed data over the communication bus 140 to one or more vehicle components, e.g., to the computer processor 130.

The cooling fan sensor 106 monitors the temperature of coolant used to regulate the temperature of the vehicle's internal combustion engine (ICE). The ECU 114 receives temperature data from the cooling fan sensor 106 and activates a switch to operate a cooling fan when the temperature of the coolant reaches a specified level. The state of the cooling fan (e.g., on/off) and speed value (e.g., low speed, medium speed, high speed) may be provided by the ECU 114 to the computer processor 130 over the communication bus 140. The cooling fan sensor 106 may be proximally located with the cooling fan in the vehicle and the cooling fan, in turn, may be disposed in any suitable location therein.

The HVAC system 108 includes physical controls for adjusting the internal climate of designated portions of the vehicle or cabin area. The HVAC system 108 may include one or more of a front end and/or rear end fan. The ECU 116 of the HVAC system 108 receives signals via the physical controls to perform an HVAC function (e.g., activate/deactivate a fan, or increase/decrease cabin temperature through a heating unit or an air conditioning unit). The state of the HVAC system 108 (e.g., on/off) or speed value (low speed, medium speed, high speed) may be provided by the ECU 116 to the computer processor 130 over the communication bus 140.

Also included in the system 100 of FIG. 1 are thermal management controllers 120a-120n, which are communicatively coupled to the communication bus 140. The thermal management controllers 120a-120n are also coupled to corresponding temperature sensors 122a-122n and to corresponding thermal management devices 124a-124n. The thermal management devices 124a-124n refer to components of the vehicle that regulate the temperature of hybrid components of the vehicle. The thermal management devices 124a-124n may be implemented, e.g., by a combination of fans, pumps, and blowers. The hybrid components relate to subsystems of the hybrid vehicle directed to performing functions associated with the electric powertrain. The hybrid components regulated by the thermal management devices 124a-124n may be any type of hybrid vehicle component that consumes power resulting in increased temperature, e.g., power conversion devices (e.g., those converting power from AC to DC, from DC to AC, or from DC to DC where voltage is stepped up or down) or a motor that drives the engine. When the electric powertrain is active during a drive cycle, these thermal management devices 124a-124n may be initiated, resulting in sounds perceived by the operator as unfamiliar. It is the noise produced by these devices 124a-124n that the exemplary noise control processes seek to mask.

The temperature sensors 122a-122n monitor the temperature of hybrid components of the electric powertrain and this temperature data is provided to the computer processor 130 over the communication bus 140 via the thermal management controllers 120a-120n, respectively.

The system 100 of FIG. 1 also includes a computer processor 130 communicatively coupled to a memory device 134. The memory device 134 stores logic 132 and models 133 created and used in implementing the exemplary noise control processes described herein. In an embodiment, the models 133 are generated for associating noise levels of various vehicle components based on different driving scenarios. By way of non-limiting example, the driving scenarios may include "autostop," "engine idle," and "45 mph." The scenario, autostop, refers to a situation in which the engine is shut down (e.g., the engine speed is '0'), and the high/low batteries are using DC power. The scenario, engine idle, refers to a situation where the engine is running but the vehicle is stopped. The scenario, 45 mph, refers to a situation when the vehicle is operating at 45 mph or averaging 45 mph over a defined period of time. It will be understood to those skilled in the art that any number of models 133 offering variable driving scenarios may be generated and used in implementing the exemplary noise control processes. The models 133 are described further herein.

As indicated above, the computer processor 130 implements logic 132 for providing the exemplary noise control processes described herein. The computer processor 130, as well as the ECUs 110, 112, 114, and 116, as well as thermal management controllers 120a-120n may be implemented, e.g., as application specific integrated circuits (ASICs), electronic circuits, or processors (shared, dedicated, or group). The computer processor 130 executes the logic 132, which may be one or more software or firmware programs, a combinational logic circuit, and/or other suitable components that provide the described functionality. In an embodiment, the computer processor 130 is part of a vehicle control module. The memory device 134 may be any type of storage device (e.g., hard disk drive, removable storage unit, cache memory, etc.) that stores data produced via the computer processor 130 and logic 132, as will be described further herein.

As shown in FIG. 1, the system 100 also includes an operator interface 136 and ambient noise detection device(s) 138. The operator interface 136 is configured to receive inputs from an operator of the vehicle. The operator interface 136 may include one or more of an interactive display device (e.g., where the display device is a touch screen display), indicators, gauges, switches, knobs, voice, buttons, dials, and the like. In an embodiment, the operator interface 136 may be part of an onboard navigation system or infotainment system. The operator interface 136 receives operator input for tuning parameters used by the noise control processes based on operator sensitivities, and sends the input to the computer processor 130 over the communication bus 140. The operator input is described further herein.

The ambient noise detection device(s) 138 provide noise data to the computer processor 130 for processing by the logic 132. The ambient noise detection device(s) 138 may be implemented as one or more sensors (e.g., microphones) disposed in various locations in the vehicle including locations associated with the internal combustion engine, cooling fan, HVAC, and hybrid components. In an embodiment, one of the ambient noise detection devices 138 may be a component of an infotainment system (e.g., radio) that determines volume settings selected by an operator in determining noise levels associated with the infotainment system.

The communication bus 140 is integrated with the vehicle and may be part of a physically wired network, a wireless network, or a combination thereof. In one embodiment, the communication bus may be part of a local area network that communicatively couples electronic components of the vehicle with the computer processor 130. If the communication bus 140 is part of a wireline network, the communication bus 140 may include one or more serial data buses or other data connections.

Figure 2:
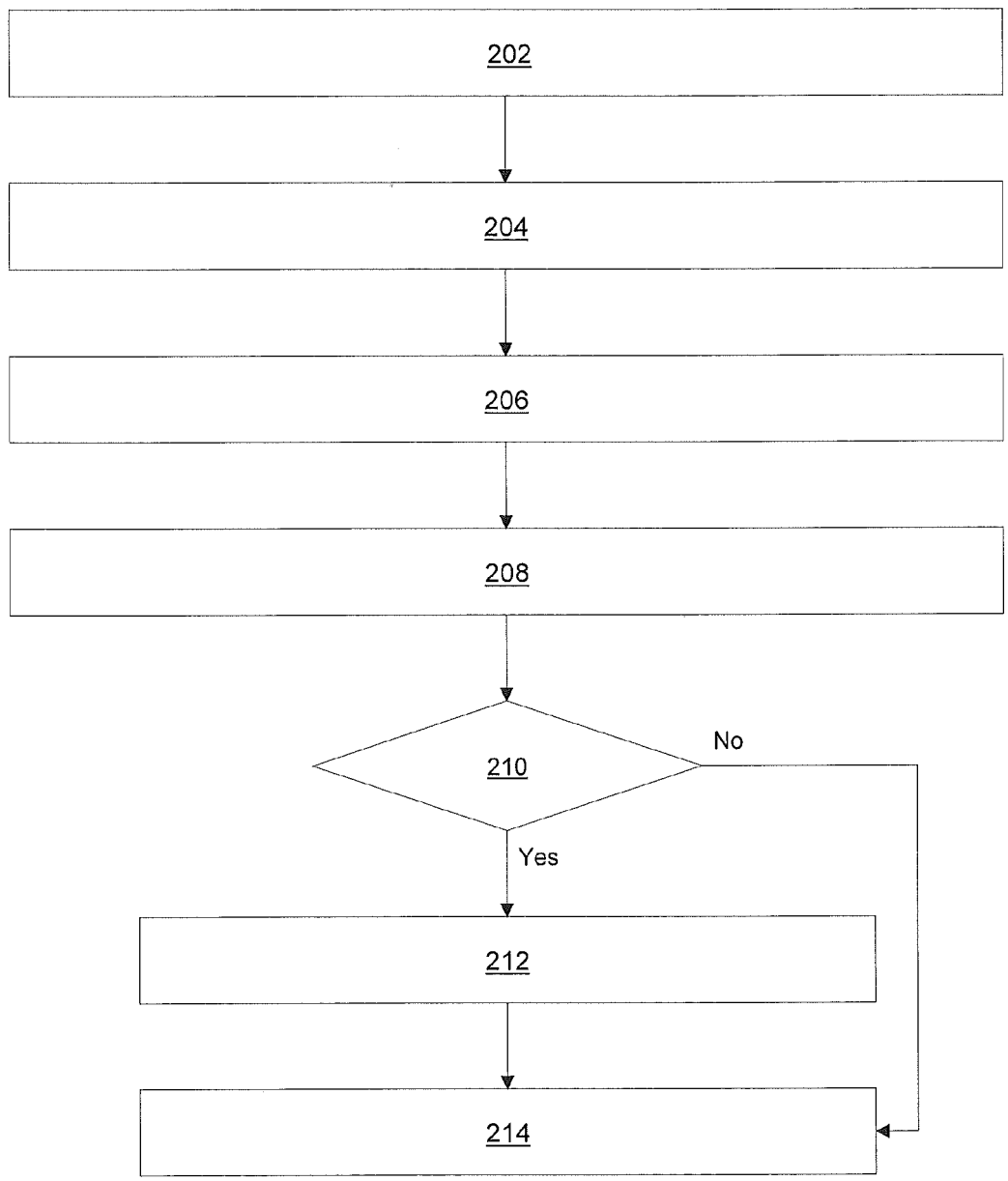
FIG. 2 is a flow diagram describing a process for implementing noise control for a vehicle in accordance with an exemplary embodiment.

Turning now to FIG. 2, an exemplary process 200 for implementing noise control for the vehicle will now be described. The process 200 described in FIG. 2 assumes that an individual is engaged in driving the vehicle of the system 100; i.e., the engine is on and a subject is in the driver compartment of the vehicle.

At step 202, the logic 132 identifies sources of noise in the vehicle. This identification may be a continuing or ongoing process. The sources of noise include vehicle noise producing components, such as the powertrain, crankshaft (e.g., where the noise is calculated from data received from sensor 102 and ECU 110), wind resistance (e.g., where the noise is calculated from data received from sensor 104 and ECU 112), cooling fan (e.g., where fan speed data is received from ECU 114), and HVAC system 108 (e.g., where blower speed is received from ECU 116). Further, ambient noise may be monitored via the ambient noise detection device(s) 138. In addition, the sources of noise include the hybrid-electric components including the thermal management devices 124a-124n associated with the electric powertrain. Thus, identifying the sources of noise may include determining which of the vehicle noise producing components are currently making noise at a given period in time.

At step 204, the logic 132 determines a decibel value for each of the sources of noise. In one embodiment, the models 133 stored in the memory device 134 may be used to identify the decibel level of a vehicle component. For example, using the data received from sensors 102, 104, and 106, and HVAC system 108, a driver scenario may be acquired, which driver scenario corresponds to one of the models 133. Suppose, for example, that the driver scenario is autostop. A model 133 for this scenario may provide that, as calculated from previously monitored vehicle data, when the vehicle is in autostop mode, a decibel value of 10 db for the vehicle speed is assumed, a decibel value of 5 db for the engine speed is assumed, and a decibel value of 15 db for the cooling fan is assumed or determined. The logic 132 is configured to determine when the vehicle is in autostop mode based at least, in part, on the data from the engine speed sensor 102 and the vehicle speed sensor 104. By contrast, when the driver scenario reflects the driver is operating at 45 mph, the corresponding model 133 indicates that the decibel value of the vehicle speed is 50 db, the decibel value of the engine speed is 40 db, and the decibel value of the cooling fan is 10 db. The logic 132 uses this information, in conjunction with a decibel value determined from one or more thermal management devices 124a-124n to determine a mask limit. The models 133 may be generated for the thermal management devices 124a-124n in a similar manner as that described above with respect to the engine, vehicle speed, and cooling fan components. For example, when a particular fan or blower (e.g., one of the thermal management devices 124a-124n) operates at a fan speed of medium, a decibel value of 40 db is assumed based on previously monitored data.

In an alternative embodiment, or in conjunction with the aforementioned embodiment with respect to the models 133, the logic 132 may be configured with decibel measuring capabilities (e.g., ambient noise detection devices 138) that analyze the sound waves produced by or in proximity of the vehicle. In this embodiment, one or more microphones in the vehicle may be used to record sounds, the logic 132 processes the recorded information to determine a decibel value, and decibel values acquired from the ambient noise detection devices 138 are used to determine a mask limit.

At step 206, the logic selects the decibel value of the vehicle noise producing components having the highest decibel value as the mask limit. For example, using the examples above, in the autostop driving scenario, the mask limit is 15 decibels, while in the 45 mph scenario, the mask limit is 50 db.

It is understood that when a hybrid-electric component reaches a pre-defined temperature, as determined by a temperature sensor 122, a request is distributed through the communication bus 140 to modify or adjust the operation (e.g., activate, de-activate, increase or decrease fan speed, etc.) of a corresponding thermal management device 124 in order to regulate the temperature of the hybrid component. In an embodiment, the logic 132 may be configured to identify operational limits of the thermal management devices 124a-124n based on the corresponding temperature readings from the temperature sensors 122a-122n. The operational limits may be defined as a lowest operating level of the thermal management device (expressed as a lowest threshold value) that can be implemented without negatively impacting the operating efficiency of the corresponding hybrid-electric component. For example, when the temperature of a hybrid-electric component is between 75 and 85 degrees, the corresponding thermal management device 124 is directed to operate at low-to-medium speed with a limit of low speed. Thus, the limit is defined for the thermal management device 124, which specifies a lowest acceptable operating parameter to ensure proper temperature regulation of the hybrid component. For example, if an operating range is determined to be low-to-medium speed for a given temperature of the hybrid component, the limit may be set as 'low,' which means when the vehicle is quiet (e.g., during autostop scenario), the thermal management device 124 will not produce any greater noise than is necessary to regulate the temperature of the hybrid component. However, when the vehicle is not quiet (e.g., during 45 mph driver scenario), the thermal management device 124 may be permitted to operate at the higher value of the operating range (e.g., medium speed). In this manner, the noise produced by the thermal management device 124 is controlled by the logic 132 to ensure the lowest possible noise in the vehicle. Thus, at step 208, the logic 132 determines operational limits of the thermal management devices 124a-124n.

At step 210, the logic 132 determines whether the current decibel value of the thermal management device 124 is greater than the decibel value of the mask limit. If so, at step 212, the logic 132 instructs the thermal management device to operate within the limits determined from step 208 based on the mask limit. For example, if the highest decibel value for each of the engine speed, vehicle speed, cooling fan, HVAC system, and ambient noise detection devices 138 is 40 db, and the highest decibel value for each of the thermal management devices 124a-124n is 45 db with a limit of 40 db, the logic 132 directs the 'loudest' thermal management device 124 to reduce its operating parameter to one that is within the decibel limit of 40 db. The logic 132 generates and sends an instruction to the corresponding thermal management controller 120 over the bus 140, which then controls the adjustment or modification of the operation of the thermal management device 124. It will be understood that in some instances, there may be multiple hybrid components which temperatures are regulated by a single thermal management device 124. In this scenario, the operating limit is set by the hybrid component having the higher operating parameters.

If, however, the current decibel value of the thermal management device 124 is less than or equal to the decibel value of the mask limit, the logic 132 may be configured to permit the thermal management device to operate at its current level at step 214.

As indicated above, the ambient noise detection devices 138 may be used by the logic 132 to consider various other sources of noise in conducting the noise control processes described herein. For example, the volume of noise introduced in the cabin of the vehicle (e.g., talking, music playing, traffic noise from nearby vehicles, etc.) may be monitored and processed to determine the mask limit. In this manner, suppose the vehicle is in autostop mode, which means that the vehicle itself is quiet and the thermal management devices 124a-124n relatively loud. If the operator of the vehicle is playing the stereo at a 90 db level, this may then be used as the mask limit, such that no modification or adjustment of the thermal management devices' operation is needed.

In addition, in one embodiment, the mask limit may be determined for particular locations in the vehicle. For example, the noise produced by a front cooling fan may be more pronounced to an operator or front passenger than to passengers in rear seating areas. Thus, the noise produced by a thermal management device 124 may not be as pronounced for the operator or front passenger, as compared to rear-seated passengers. In this example, suppose the front end fan has a decibel value of 30 as perceived by the operator and front passenger, whereas the decibel value perceived for occupants in the rear seats is 20 db. If the thermal management device 124 is producing noise at 40 db, and its limit is set for 10 db, the logic 132 may direct the thermal management device 124 to operate at a level that produces 10 db of noise. Thus, the mask limit is adjustable base on locations in the vehicle.

As indicated above, an operator of the vehicle may input selected parameters that control noise in the vehicle based on operator preferences and/or sensitivities. For example, one operator who is particularly sensitive to noise may select parameters that mask the noises produced by the thermal management devices 124a-124n whenever an opportunity to do is available. Another operator, who is not sensitive to the noise or who may be energy conscious may select parameters that refrain from masking the noises when it is energy-efficient to do so. The logic 132 may be configured to prompt the operator to enter such selections via the operator interface device 136.

Also, as indicated above, the logic 132 may be configured to conduct remedial arbitration when data from one or more of the noise sources in the vehicle cannot be acquired (e.g., if one of the sensor data from sensors 102, 104, and 106, or HVAC system 108, and/or the ambient noise detection device(s) 138 is unavailable). In this embodiment, the logic 132 uses the highest decibel value of the available sources of noise to determine the mask limit.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A method for implementing noise control for a vehicle, the method comprising:
   identifying sources of noise in the vehicle, via a computer processor, the sources of noise indicative of vehicle noise producing components and include a thermal management device of a hybrid-electric component of the vehicle and non-hybrid-electric components of the vehicle;
   determining a decibel value of the noise produced by each of the sources of noise;
   selecting, via the computer processor, the decibel value of one of the vehicle noise producing components having a highest decibel value as a mask limit;
   determining an operational limit for the thermal management device, the operational limit including a lowest threshold operating value which, when implemented, maintains a threshold level operating efficiency of the hybrid-electric component;
   determining a decibel value associated with the operational limit;
   if a decibel value of the noise produced by the thermal management device exceeds the mask limit, reducing a level of operation of the thermal management device to coincide with the decibel value of the operational limit; and
   if the decibel value of the noise produced by the thermal management device is lower than or meets the mask limit, maintaining a current level of operation of the thermal management device.

2. The method of claim 1, wherein the thermal management device includes at least one of a fan, a pump, and a blower.

3. The method of claim 1, wherein the vehicle noise producing components include a powertrain, a crankshaft, and at least one of:
   a heating, ventilation, and air-conditioning system;
   a cooling fan; and
   a stereo system.

4. The method of claim 3, further comprising:
   generating a model including decibel values of noise produced by the vehicle noise producing components with respect to a plurality of vehicle operating conditions, the vehicle operating conditions including an engine speed, a vehicle speed, and at least one of:
   operating settings of the heating, ventilation, and air-conditioning system;
   operating settings of the cooling fan.

5. The method of claim 4, wherein the model reflects the decibel values produced by the non-hybrid-electric components based on a driving scenario, the driving scenario including at least one of idle, autostop, and a selected vehicle speed measured in miles per hour.

6. The method of claim 1, wherein the sources of noise further include:
   a stereo system in the vehicle;
   vehicle occupant communications; and
   vehicles that are proximally located with respect to the vehicle;
   wherein the non-hybrid-electric components further include at least one microphone disposed in the vehicle, the at least one microphone monitoring the sources of noise.

7. The method of claim 1, further comprising:
   for a given one of the vehicle noise producing components, determining the mask limit as a function of a location in the vehicle for which the noise is perceived by its occupants.

8. A system for implementing noise control for a vehicle, comprising:
   a computer processor integrated with the vehicle; and
   logic executable by the computer processor, the logic is configured to implement a method, the method includes:
   identifying sources of noise in the vehicle, the sources of noise indicative of vehicle noise producing components and include a thermal management device of a hybrid-electric component of the vehicle and non-hybrid-electric components of the vehicle;
   determining a decibel value of the noise produced by each of the sources of noise;
   selecting the decibel value of one of the vehicle noise producing components having a highest decibel value as a mask limit;
   determining an operational limit for the thermal management device, the operational limit including a lowest threshold operating value which, when implemented, maintains a threshold level operating efficiency of the hybrid-electric component;
   determining a decibel value associated with the operational limit;
   if a decibel value of the noise produced by the thermal management device exceeds the mask limit, reducing a level of operation of the thermal management device to coincide with the decibel value of the operational limit; and
   if the decibel value of the noise produced by the thermal management device is lower than or meets the mask limit, maintaining a current level of operation of the thermal management device.

9. The system of claim 8, wherein the thermal management device includes at least one of a fan, a pump, and a blower.

10. The system of claim 8, wherein the vehicle noise producing components include a powertrain, a crankshaft, and at least one of:
    a heating, ventilation, and air-conditioning system;
    a cooling fan; and
    a stereo system.

11. The system of claim 10, wherein the method further comprises:
generating a model including decibel values of noise produced by the vehicle noise producing components with respect to a plurality of vehicle operating conditions, the vehicle operating conditions including an engine speed, a vehicle speed, and at least one of:
operating settings of the heating, ventilation, and air-conditioning system;
operating settings of the cooling fan.

12. The system of claim 11, wherein the model reflects the decibel values produced by the non-hybrid-electric components based on a driving scenario, the driving scenario including at least one of idle, autostop, and a selected vehicle speed measured in miles per hour.

13. The system of claim 8, wherein the sources of noise further include:
a stereo system in the vehicle;
vehicle occupant communications; and
vehicles that are proximally located with respect to the vehicle;
wherein the non-hybrid-electric components further include at least one microphone disposed in the vehicle, the at least one microphone monitoring the sources of noise.

14. The system of claim 8, wherein the method further comprises:
for a given one of the vehicle noise producing components, determining the mask limit as a function of a location in the vehicle for which the noise is perceived by its occupants.

15. A computer program product for implementing noise control for a vehicle, the computer program product comprising a non-transitory computer-readable storage medium having instructions embodied thereon, which when executed by a computer causes the computer to implement a method, the method comprising:
identifying sources of noise in the vehicle, the sources of noise indicative of vehicle noise producing components and include a thermal management device of a hybrid-electric component of the vehicle and non-hybrid-electric components of the vehicle;
determining a decibel value of the noise produced by each of the sources of noise;
selecting the decibel value of one of the vehicle noise producing components having a highest decibel value as a mask limit;
determining an operational limit for the thermal management device, the operational limit including a lowest threshold operating value which, when implemented, maintains a threshold level operating efficiency of the hybrid-electric component;
determining a decibel value associated with the operational limit;
if a decibel value of the noise produced by the thermal management device exceeds the mask limit, reducing a level of operation of the thermal management device to coincide with the decibel value of the operational limit; and
if the decibel value of the noise produced by the thermal management device is lower than or meets the mask limit, maintaining a current level of operation of the thermal management device.

16. The computer program product of claim 15, wherein the thermal management device includes at least one of a fan, a pump, and a blower.

17. The computer program product of claim 15, wherein the vehicle noise producing components include a powertrain, a crankshaft, and at least one of:
a heating, ventilation, and air-conditioning system;
a cooling fan; and
a stereo system.

18. The computer program product of claim 17, wherein the method further comprises:
generating a model including decibel values of noise produced by the vehicle noise producing components with respect to a plurality of vehicle operating conditions, the vehicle operating conditions including an engine speed, a vehicle speed, and at least one of:
operating settings of the heating, ventilation, and air-conditioning system;
operating settings of the cooling fan.

19. The computer program product of claim 18, wherein the model reflects the decibel values produced by the non-hybrid-electric components based on a driving scenario, the driving scenario including at least one of idle, autostop, and a selected vehicle speed measured in miles per hour.

20. The computer program product of claim 15, wherein the sources of noise further include:
a stereo system in the vehicle;
vehicle occupant communications; and
vehicles that are proximally located with respect to the vehicle;
wherein the non-hybrid-electric components further include at least one microphone disposed in the vehicle, the at least one microphone monitoring the sources of noise.

* * * * *